US008704834B2

(12) United States Patent
Nguyen et al.

(10) Patent No.: US 8,704,834 B2
(45) Date of Patent: Apr. 22, 2014

(54) SYNCHRONIZATION OF VIDEO INPUT DATA STREAMS AND VIDEO OUTPUT DATA STREAMS

(75) Inventors: Dat Nguyen, Santa Clara, CA (US); Lauro Manalac, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1264 days.

(21) Appl. No.: 11/999,147

(22) Filed: Dec. 3, 2007

(65) Prior Publication Data
US 2009/0141032 A1    Jun. 4, 2009

(51) Int. Cl.
*G06F 15/00* (2006.01)

(52) U.S. Cl.
USPC .......................... 345/501; 345/547

(58) Field of Classification Search
USPC .................................... 345/501, 547
See application file for complete search history.

(56) References Cited

U.S. PATENT DOCUMENTS

| | | | |
|---|---|---|---|
| 4,665,556 A * | 5/1987 | Fukushima et al. ........ 382/304 |
| 5,163,136 A | 11/1992 | Richmond |
| 5,189,671 A | 2/1993 | Cheng |
| 5,426,731 A * | 6/1995 | Masukane et al. .......... 345/501 |
| 5,585,931 A | 12/1996 | Juri et al. |
| 5,774,206 A | 6/1998 | Wasserman et al. |
| 5,781,239 A | 7/1998 | Mattela et al. |
| 5,793,863 A | 8/1998 | Hashimoto |
| 5,796,743 A | 8/1998 | Bunting et al. |
| 5,818,529 A | 10/1998 | Asamura et al. |
| 5,821,886 A | 10/1998 | Son |
| 5,850,482 A | 12/1998 | Meany et al. |
| 5,946,037 A * | 8/1999 | Ahnn ........................ 375/240.01 |
| 5,969,750 A | 10/1999 | Hsieh et al. |
| 5,990,812 A | 11/1999 | Bakhmutsky |
| 6,008,745 A | 12/1999 | Zandi et al. |
| 6,023,088 A | 2/2000 | Son |
| 6,026,506 A | 2/2000 | Anderson et al. |
| 6,041,403 A | 3/2000 | Parker et al. |
| 6,047,357 A | 4/2000 | Bannon et al. |
| 6,144,322 A | 11/2000 | Sato |
| 6,298,370 B1 | 10/2001 | Tang et al. |
| 6,317,063 B1 | 11/2001 | Matsubara |
| 6,339,658 B1 | 1/2002 | Moccagatta et al. |
| 6,404,928 B1 | 6/2002 | Shaw et al. |
| 6,462,744 B1 | 10/2002 | Mochida et al. |
| 6,480,489 B1 | 11/2002 | Muller et al. |
| 6,493,872 B1 * | 12/2002 | Rangan et al. ................ 725/32 |
| 6,507,614 B1 | 1/2003 | Li |
| 6,529,631 B1 | 3/2003 | Peterson et al. |
| 6,543,023 B2 | 4/2003 | Bessios |
| 6,552,673 B2 | 4/2003 | Webb |
| 6,556,252 B1 * | 4/2003 | Kim ............................. 348/565 |
| 6,563,440 B1 | 5/2003 | Kangas |
| 6,563,441 B1 | 5/2003 | Gold |

(Continued)

*Primary Examiner* — Maurice L McDowell, Jr.

(57) ABSTRACT

A method for synchronizing an input data stream with an output data stream in a video processor. The method includes receiving an input data stream and receiving an output data stream, wherein the input data stream and the output data stream each comprise a plurality of pixels. The method further includes sequentially storing pixels of the input data stream using an input buffer and sequentially storing pixels of the output data stream using an output buffer. Timing information is determined by examining the input data stream and the output data stream. A synchronization adjustment is applied to the input buffer and the output buffer in accordance with the timing information. Pixels are output from the input buffer and the output buffer to produce a synchronized mixed video output stream.

19 Claims, 8 Drawing Sheets

(56) References Cited

U.S. PATENT DOCUMENTS

| | | |
|---|---|---|
| 6,573,946 B1 * | 6/2003 | Gryskiewicz ................. 348/600 |
| 6,577,681 B1 | 6/2003 | Kimura |
| 6,654,539 B1 | 11/2003 | Duruoz et al. |
| 6,675,282 B2 | 1/2004 | Hum et al. |
| 6,738,522 B1 | 5/2004 | Hsu et al. |
| 6,795,503 B2 | 9/2004 | Nakao et al. |
| 6,839,624 B1 | 1/2005 | Beesley et al. |
| 6,925,119 B2 | 8/2005 | Bartolucci et al. |
| 6,981,073 B2 | 12/2005 | Wang et al. |
| 7,016,547 B1 | 3/2006 | Smirnov |
| 7,051,123 B1 | 5/2006 | Baker et al. |
| 7,068,407 B2 | 6/2006 | Sakai et al. |
| 7,068,919 B2 | 6/2006 | Ando et al. |
| 7,069,407 B1 | 6/2006 | Vasudevan et al. |
| 7,074,153 B2 | 7/2006 | Usoro et al. |
| 7,113,546 B1 | 9/2006 | Kovacevic et al. |
| 7,119,813 B1 | 10/2006 | Hollis et al. |
| 7,158,539 B2 | 1/2007 | Zhang et al. |
| 7,209,636 B2 | 4/2007 | Imahashi et al. |
| 7,230,986 B2 | 6/2007 | Wise et al. |
| 7,248,740 B2 | 7/2007 | Sullivan |
| 7,286,543 B2 | 10/2007 | Bass et al. |
| 7,324,026 B2 | 1/2008 | Puri et al. |
| 7,327,378 B2 | 2/2008 | Han et al. |
| 7,606,313 B2 | 10/2009 | Raman et al. |
| 7,613,605 B2 | 11/2009 | Funakoshi |
| 7,627,042 B2 | 12/2009 | Raman et al. |
| 7,724,827 B2 | 5/2010 | Liang et al. |
| 7,765,320 B2 | 7/2010 | Vehse et al. |
| 2001/0010755 A1 | 8/2001 | Ando et al. |
| 2001/0026585 A1 | 10/2001 | Kumaki |
| 2002/0001411 A1 | 1/2002 | Suzuki et al. |
| 2002/0094031 A1 | 7/2002 | Ngai et al. |
| 2002/0135683 A1 | 9/2002 | Tamama et al. |
| 2003/0043919 A1 | 3/2003 | Haddad |
| 2003/0067977 A1 | 4/2003 | Chu et al. |
| 2003/0142105 A1 | 7/2003 | Lavelle et al. |
| 2003/0156652 A1 | 8/2003 | Wise et al. |
| 2003/0179706 A1 | 9/2003 | Goetzinger et al. |
| 2003/0191788 A1 | 10/2003 | Auyeung et al. |
| 2003/0196040 A1 | 10/2003 | Hosogi et al. |
| 2004/0028127 A1 | 2/2004 | Subramaniyan |
| 2004/0028142 A1 | 2/2004 | Kim |
| 2004/0056787 A1 | 3/2004 | Bossen |
| 2004/0059770 A1 | 3/2004 | Bossen |
| 2004/0067043 A1 | 4/2004 | Duruoz et al. |
| 2004/0081245 A1 | 4/2004 | Deeley et al. |
| 2004/0096002 A1 | 5/2004 | Zdepski et al. |
| 2004/0130553 A1 | 7/2004 | Ushida et al. |
| 2004/0145677 A1 | 7/2004 | Raman et al. |
| 2005/0008331 A1 | 1/2005 | Nishimura et al. |
| 2005/0123274 A1 | 6/2005 | Crinon et al. |
| 2005/0182778 A1 | 8/2005 | Heuer et al. |
| 2005/0207497 A1 | 9/2005 | Rovati et al. |
| 2006/0013321 A1 | 1/2006 | Sekiguchi et al. |
| 2006/0083306 A1 | 4/2006 | Hsu |
| 2006/0176309 A1 | 8/2006 | Gadre et al. |
| 2006/0256120 A1 | 11/2006 | Ushida et al. |
| 2007/0006060 A1 | 1/2007 | Walker |
| 2007/0083788 A1 | 4/2007 | Johnson et al. |
| 2007/0263728 A1 | 11/2007 | Yanagihara et al. |
| 2007/0288971 A1 | 12/2007 | Cragun et al. |
| 2007/0291858 A1 | 12/2007 | Hussain et al. |
| 2008/0069464 A1 | 3/2008 | Nakayama |
| 2008/0162860 A1 | 7/2008 | Sabbatini et al. |
| 2008/0219575 A1 | 9/2008 | Wittenstein |
| 2008/0285648 A1 | 11/2008 | Plagne |
| 2008/0317138 A1 | 12/2008 | Jia |
| 2009/0083788 A1 | 3/2009 | Russell et al. |

* cited by examiner

SYNCHRONIZATION OF VIDEO INPUT DATA STREAMS AND VIDEO OUTPUT DATA STREAMS

FIELD OF THE INVENTION

The present invention is generally related to hardware accelerated graphics computer systems.

BACKGROUND OF THE INVENTION

Digital computers are being used today to perform a wide variety of tasks. A primary means for interfacing a computer system with its user is through its graphics display. The graphical depiction of data, through, for example, full motion video, detailed true color images, photorealistic 3D modeling, and the like, has become a preferred mechanism for human interaction with computer systems. For example, the graphical depiction of data is often the most efficient way of presenting complex data to the user. Similarly, high-performance interactive 3D rendering has become a compelling entertainment application for computer systems.

Computer systems are increasingly being used to handle video streams and video information in addition to high performance 3D rendering. Typical video processing applications utilize computer systems that have been specifically configured for handling video information. Such computer systems usually include dedicated video processing hardware for the processing and handling of constituent video frame data comprising a video stream. Such video processing hardware includes, for example, video processor amplifiers (e.g., procamps), overlay engines (e.g., for compositing video or images), specialized DACs (digital to analog converters), and the like.

Problems exist with the implementation of video processing hardware that is configured to handle multiple video streams. The video technology deployed in many consumer electronics-type and professional level devices relies upon one or more video processors to mix multiple video streams and/or format and/or enhance the resulting video signals for display. For example, when performing video mixing or keying, it is important to align an input video stream to an output video stream before performing the mixing. Even when the systems are in synchronization (e.g., "genlock"), the output video stream can be several pixels offset from the input video stream.

The undesirable offset causes problem with the mixing process. One prior art solution to the offset problem is to buffer the entire frame with external memory, and then perform the mixing of video frame data on the next frame. This solution is problematic because it requires a large amount of external memory to buffer an entire video frame. This solution is also difficult to implement in real-time due to the fact that large amounts of video data need to be accessed in the memory and processed at 30 frames per second or more. Consequently, such solutions are inordinately expensive to implement for high resolution video (e.g., HDTV, etc.). Thus what is required is a solution that can implement a high-quality video stream synchronization while eliminating undesirable offset effects.

SUMMARY OF THE INVENTION

Embodiments of the present invention provide a solution that can implement high-quality video stream synchronization while eliminating undesirable offset effects. Embodiments of the present invention can implement real-time multiple video stream synchronization of high-resolution video sources.

In one embodiment, the present invention is implemented as a video processor based method for synchronizing an input data stream with an output data stream in a video processor. The method includes receiving an input data stream (e.g., from a first video source) and receiving an output data stream (e.g., from a second video source). The input data stream and the output data stream each comprise a plurality of pixels, for example, from a scanline of a video frame. The method further includes sequentially storing pixels of the input data stream using an input buffer and sequentially storing pixels of the output data stream using an output buffer. Timing information is determined by examining the input data stream and the output data stream. In one embodiment, the timing information comprises the horizontal sync signals of each stream. A synchronization adjustment is applied to the input buffer and the output buffer in accordance with the timing information. Pixels are output from the input buffer and the output buffer to produce a synchronized mixed video output stream.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
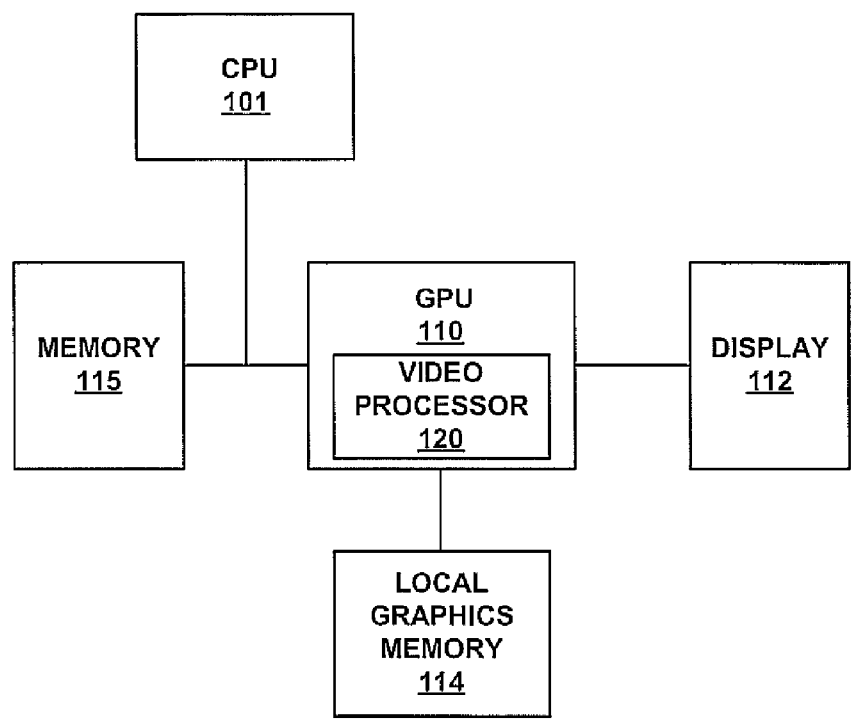
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Embodiments of the present invention provide a video processor stream synchronization solution that can implement a high-quality video stream synchronization while eliminating undesirable offset effects, and that can implement real-time multiple video stream synchronization of high-resolution video sources. In one embodiment, the present invention is implemented as a video processor based method for synchronizing an input data stream with an output data stream in a video processor (e.g., via processor 120). The method includes receiving an input data stream (e.g., from a first video source) and receiving an output data stream (e.g., from a second video source). The input data stream and the output data stream each comprise a plurality of pixels, for example, from a scanline of a video frame.

The method further includes sequentially storing pixels of the input data stream using an input buffer and sequentially storing pixels of the output data stream using an output buffer. Timing information is determined by examining the input data stream and the output data stream. In one embodiment, the timing information comprises the horizontal sync signals of each stream, or the like. A synchronization adjustment is applied to the input buffer and the output buffer in accordance with the timing information. Pixels are output from the input buffer and the output buffer to produce a synchronized mixed video output stream. The video processor can be mounted on a graphics card coupled to the computer system (e.g., via a PCI express connector, AGP connector, etc.), can be integrated within the GPU integrated circuit die, can be implemented as its own stand-alone add-in card, or the like. Embodiments of the present invention and their benefits are further described below.

Figure 2:
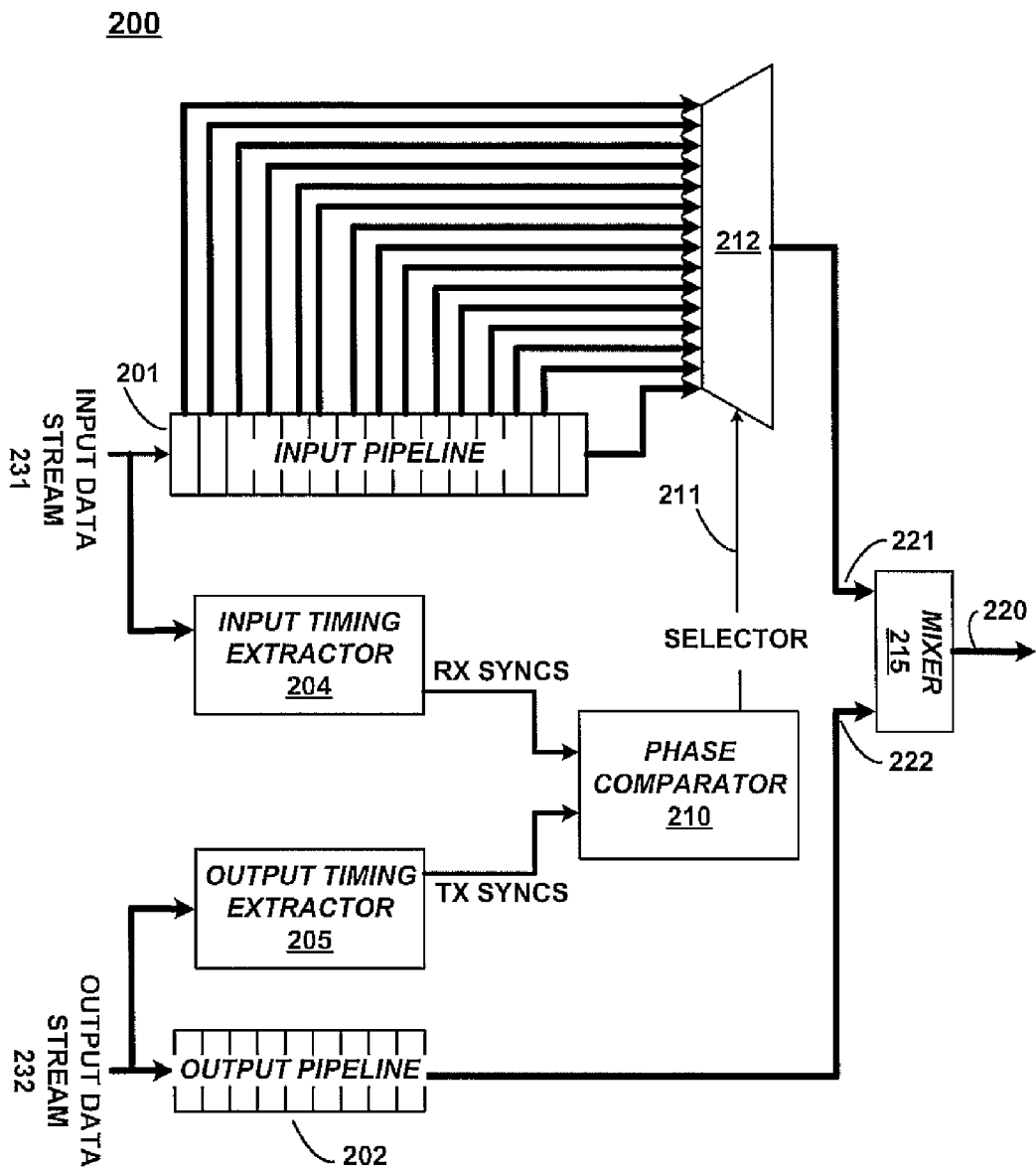
FIG. 2 shows a diagram of a video processor synchronization system in accordance with one embodiment of the present invention.

FIG. 2 shows a diagram of a video processor synchronization system 200 in accordance with one embodiment of the present invention. As depicted in FIG. 2, system 200 includes a first input 231 coupled to a buffer 201 and a second input 232 coupled to a buffer 202. The inputs 201-202 are also coupled to input timing extractors 204-205 as shown. The outputs of the timing extractors 204-205 are coupled to a phase comparator 210, which controls an output multiplexer 212. Pixels from the buffers 201-202 are coupled to the mixer 215 for mixing into the resulting synchronized output video data signal 220.

The system 200 embodiment implements video data stream synchronization between the video data streams that are arriving from two separate video sources (e.g., inputs 231-232). System 200 implements the stream synchronization intelligently while using a minimal amount of memory.

The input data stream received at the input 231 is from a first video source. For example, this video source can be a broadcaster describing a sporting event, video of a remote location, or the like. This video stream needs to be properly synchronized with the input data stream received at the input 202. The video stream received at the input 232 can be, for example, a video of a news anchor, a sport studio, or the like. The input data stream and the output data stream each comprise a plurality of pixels, for example, from a scanline of a video frame. The objective of the system 200 is to mix the two video streams 231-232 together such that they can be properly rendered on a display. The mixing can involve, for example, picture in picture with one video stream being displayed within a small window inside the second larger video stream, two pictures side-by-side, or the like. The mixing needs to be performed such that the two video streams are in alignment with regard to their pixel clock accuracies. In other words, the system 200 needs to be "genlocked" with the timing of both video streams interfaced with a reference timing.

System 200 uses the buffers 201-202 as pixel pipelines. The buffers 201-202 sequentially store pixels of the input data stream and the output data stream. As depicted in FIG. 2, pixels arrive on the left-hand side of the buffers 201-202 and are shift along towards the right hand side of the buffers 201-202. Timing information is determined by input timing extractor 204 and the output timing extractor 205 examining the input data stream and the output data stream respectively. The timing information examined by the extractors 204-205 typically comprises one of the horizontal sync signals, vertical sync signals, and field signals, or some combination thereof.

The phase comparator 210 examines the timing information provided by the extractors 204-205 and produces a synchronization adjustment signal 211. This synchronization adjustment signal 211 is a selector signal that controls the multiplexer 212. The multiplexer 212 then applies the synchronization adjustment to the input buffer 201 by selecting an appropriate stage of the buffer 201 to tap the input data stream such that the input data stream arrives at the input 221 of the mixer 215 in synchronization with the output data stream arriving at the input 222 of the mixer 215. The streams arriving at the inputs 221-222 are in accordance with the timing information determined by the extractors 204-205. The mixer 215 then mixes the data streams from the inputs 221-222 to produce a synchronized mixed video output stream at the output of 220. For example, the mixer 215 can perform video key and compositing on the streams. In this manner, pixels are transmitted from the input buffer 201 and the output buffer 202 to produce a synchronized mixed video output stream 220.

Figure 3:
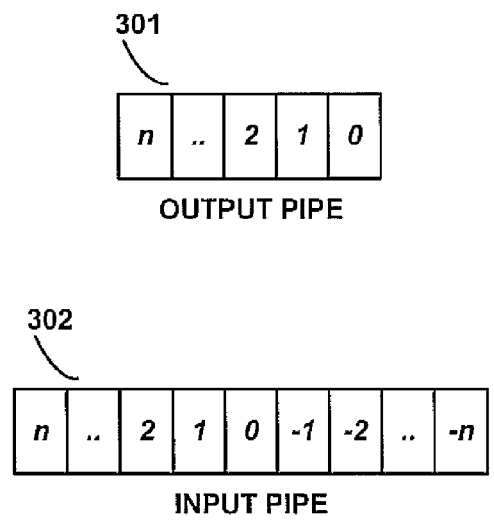
FIG. 3 shows a portion of an output buffer and a portion of an input buffer in accordance with one embodiment of the present invention.

FIG. 3 shows a portion of an output buffer 301 and a portion of an input buffer 302 in accordance with one embodiment of the present invention. As depicted in FIG. 3, the buffers 301-302 are depicted holding pixels of a respective data stream, represented by the numbers within the stages.

As described above, the buffers 301-302 can be thought of as pipelines that sequentially store arriving pixels of the data streams. The pipelines are used to track past, present, and future data. The input pipeline keeps track of past, present, and future data. The output pipeline is used to allow a look ahead of future input data. As used herein, the term past data refers to the data which has already been sent with respect to the current data flow. In this context, it is the data which has been sent with respect to the current output video data. The term present data refers to the data which is being sent out. The term future data refers to the data which has not yet been sent out with respect to the current data flow. In the pipe line architecture of system 200 and with respect to the output data flow through the pipe, the future input data is known at the present. Thus it is called future data.

The term genlock is used to describe a situation when system timing is in alignment with the input reference to pixel clock accuracy. When a system is genlocked to the reference input, its timing is in phase with the reference timing. While the system is genlocked, the input can either be a few pixels in advance of or a few pixels lagging behind the output stream. Having both pipes (e.g., buffers 301-302) allows for synchronization of data regardless of where the data streams are with respect to each other.

The output pipeline 301 is used to allow a look ahead of input data stream. The pipe length is dependent on the maximum number of pixels the input stream can lead the output stream while in genlocked. The input pipeline 302 is used for tracking the past, present, and future data. Its pipe length should be longer than the output pipeline 301 (e.g., approximately twice as long, etc.). The data can be extracted at any point on this pipe (e.g., via the multiplexer 212 of FIG. 2). In the FIG. 3 illustration, the timing reference pixel is shown as "0" with future pixels being negative numbers and past pixels being positive numbers.

Figure 4:
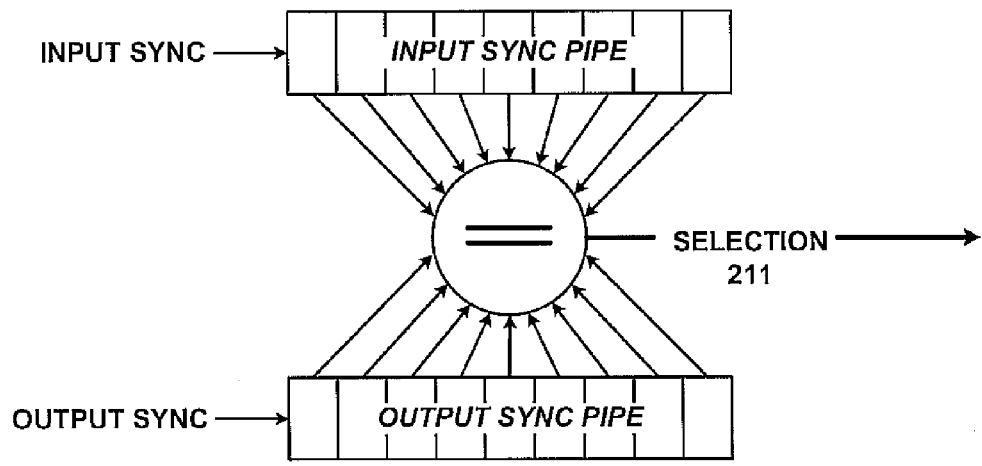
FIG. 4 shows a diagram of the internal components of the phase comparator in accordance with one embodiment of the present invention.

FIG. 4 shows a diagram of the internal components of the phase comparator 210 in accordance with one embodiment of the present invention. As depicted in FIG. 4, the phase comparator 210 includes an input synchronization pipe and an output synchronization pipe. The pipes are used to compare the sync information provided by the extractors 204-205. Its job is to determine the relative position of the input data with respect to the output data. Based on this sync information, the phase comparator generates a selector index (e.g., a synchronization adjustment signal). This selector index 211 controls the multiplexer 212 to extract the aligned data from the appropriate stage of the input pipe. Thus, the selector index 211 effectively aligns the input stream to the output stream. The comparator detects where the alignment point is and generates a pointer via the selector index 211.

Figure 5:
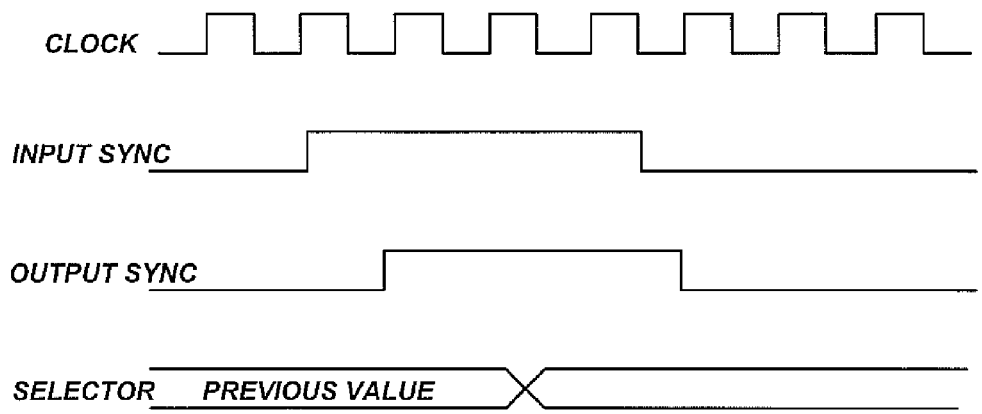
FIG. 5 shows an exemplary timing diagram of a phase comparator in accordance with one embodiment of the present invention.

FIG. 5 shows an exemplary timing diagram of signals of the phase comparator 210 in accordance with one embodiment of the present invention. In the FIG. 5 example, it can be seen that the input sync is leading the output sync by one clock. Thus, the selector (e.g., selector index 211) is set to minus one.

Figure 6:
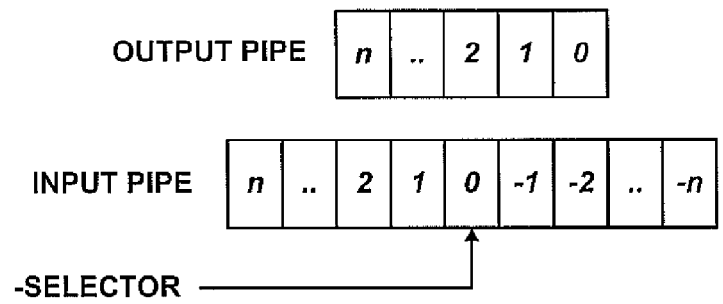
FIG. 6 shows a diagram of an output pipe and an input pipe where the output stream and the input stream are in alignment in accordance with one embodiment of the present invention.
Figure 7:
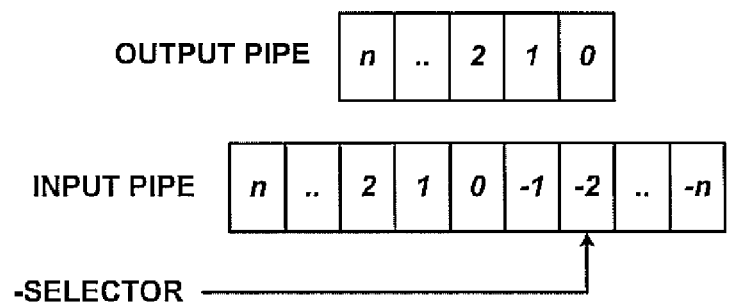
FIG. 7 shows a diagram of an output pipe and an input pipe where the input stream is leading the output stream in accordance with one embodiment of the present invention.
Figure 8:
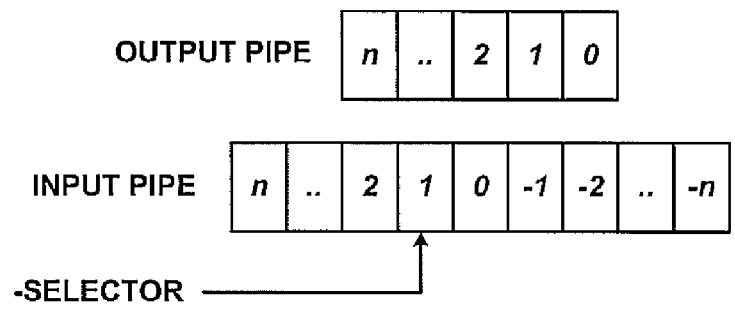
FIG. 8 shows a diagram of an output pipe and an input pipe where the input stream is lagging the output stream in accordance with one embodiment of the present invention.

FIG. 6, FIG. 7, and FIG. 8 show examples for the respective output pipe and input pipe where the streams are in alignment, the input stream is leading the output stream, and the input stream lagging the output stream, respectively. As shown in FIG. 6, the reference pixels "0" are in alignment. Thus, the multiplexer selector (e.g., multiplexer 212 of FIG. 2) is set to extract pixel data at the index 0. FIG. 7 shows a case where the input data stream leads the output data stream. In this case, the multiplexer selector will extract the pixel data at the −2 position. FIG. 8 shows a case where the input data stream lags the output data stream. In this case, the multiplexer selector will extract the pixel data at the +1 position.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a video processor, a method for synchronizing an input data stream with an output data stream, comprising:

receiving an input data stream using said video processor; and receiving an output data stream, wherein the input data stream and the output data stream each comprise a plurality of pixels;

sequentially storing pixels of the input data stream using an input buffer;

sequentially storing pixels of the output data stream using an output buffer;

determining timing information by examining the input data stream and the output data stream;

apply a synchronization adjustment to the input buffer and the output buffer in accordance with the timing information; and outputting pixels from the input buffer and the output buffer to produce a synchronized mixed video output stream, wherein a mixer is coupled to the input buffer and the output buffer outputs pixels from the input buffer and the output buffer to produce a synchronized mixed video output stream without buffering a full frame.

2. The method of claim 1, wherein the pixels of the input data stream and the pixels of the output data stream each comprise a scan line of a video frame.

3. The method of claim 1, wherein the input buffer comprises an input pixel pipeline and the output buffer comprises an output pixel pipeline.

4. The method of claim 3, wherein the input buffer is longer than the output buffer.

5. The method of claim 4, wherein the timing information comprises horizontal sync and vertical sync information.

6. The method of claim 1, wherein the timing information is determined by using an input timing extractor coupled to receive the input data stream and an output timing extractor coupled to receive the output data stream.

7. The method of claim 1, wherein the synchronization adjustment is determined by a phase comparator coupled to receive the timing information and generate a selector index, wherein the selector controls the outputting of pixel from the input buffer and the output buffer.

8. A video processor for synchronizing an input data stream with an output data stream, comprising:
an first input for receiving an input data stream; and
an second input for receiving an output data stream, wherein the input data stream and the output data stream each comprise a plurality of pixels;
an input buffer coupled to the first input for sequentially storing pixels of the input data stream;
an output buffer coupled to the second input for sequentially storing pixels of the output data stream;
a timing extractor coupled to the first input and the second input for determining timing information by examining the input data stream and the output data stream;
a phase comparator coupled to the input buffer and the output buffer for applying a synchronization adjustment to the input buffer and the output buffer in accordance with the timing information; and
a mixer coupled to the input buffer and the output buffer for outputting pixels from the input buffer and the output buffer to produce a synchronized mixed video output stream in accordance with the synchronization adjustment from the phase comparator, wherein the mixer is coupled to the input buffer and the output buffer outputs pixels from the input buffer and the output buffer to produce a synchronized mixed video output stream without buffering a full frame.

9. The video processor of claim 8, wherein the pixels of the input data stream and the pixels of the output data stream each comprise a scan line of a video frame.

10. The video processor of claim 8, wherein the input buffer comprises an input pixel pipeline and the output buffer comprises an output pixel pipeline.

11. The video processor of claim 10, wherein the output pixel pipeline is at least twice as long as the input pixel pipeline.

12. The video processor of claim 8, wherein the timing extractor further comprises:
an input timing extractor coupled to receive the input data stream; and
an output timing extractor coupled to receive the output data stream, wherein the timing information comprises horizontal sync and vertical sync information.

13. The video processor of claim 8, further comprising:
a multiplexer coupled to the input buffer and coupled to the mixer, wherein the synchronization adjustment is determined by a phase comparator coupled to receive the timing information and generate a selector index, wherein the selector controls the multiplexer to ensure the outputting of pixels from the input buffer to the mixer is in synchronization with the outputting of pixels from the output buffer to the mixer.

14. A computer system, comprising:
a system memory;
a central processor unit coupled to the system memory; and
a graphics processor unit communicatively coupled to the central processor unit;
a video processor coupled to the graphics processor unit for synchronizing a video input data stream with a video output data stream for a video mixing process, wherein the video processor further comprises:
an first input for receiving an input data stream; and
an second input for receiving an output data stream, wherein the input data stream and the output data stream each comprise a plurality of pixels;
an input buffer coupled to the first input for sequentially storing pixels of the input data stream;
an output buffer coupled to the second input for sequentially storing pixels of the output data stream;
a timing extractor coupled to the first input and the second input for determining timing information by examining the input data stream and the output data stream;
a phase comparator coupled to the input buffer and the output buffer for applying a synchronization adjustment to the input buffer and the output buffer in accordance with the timing information; and
a mixer coupled to the input buffer and the output buffer for outputting pixels from the input buffer and the output buffer to produce a synchronized mixed video output stream in accordance with the synchronization adjustment from the phase comparator, wherein t mixer is coupled to the input buffer and the output buffer outputs pixels from the input buffer and the output buffer to produce a synchronized mixed video output stream without buffering a full frame.

15. The computer system of claim 14, wherein the pixels of the input data stream and the pixels of the output data stream each comprise a scan line of a video frame.

16. The computer system of claim 14, wherein the input buffer comprises an input pixel pipeline and the output buffer comprises an output pixel pipeline.

17. The computer system of claim 16, wherein the input buffer is longer than the output buffer.

18. The computer system of claim 14, wherein the timing extractor further comprises:
   an input timing extractor coupled to receive the input data stream; and
   an output timing extractor coupled to receive the output data stream, wherein the timing information comprises horizontal sync and vertical sync information.

19. The computer system of claim 14, further comprising:
   a multiplexer coupled to the input buffer and coupled to the mixer, wherein the synchronization adjustment is determined by a phase comparator coupled to receive the timing information and generate a selector index, wherein the selector controls the multiplexer to ensure the outputting of pixels from the input buffer to the mixer is in synchronization with the outputting of pixels from the output buffer to the mixer.

* * * * *